(12) United States Patent
Hashimoto

(10) Patent No.: US 8,509,605 B2
(45) Date of Patent: Aug. 13, 2013

(54) SYNCHRONIZED REPRODUCTION SYSTEM AND SYNCHRONIZED REPRODUCTION METHOD

(75) Inventor: Hiroyuki Hashimoto, Suwa-gun (JP)

(73) Assignee: Seiko Epson Corporation, Tokyo (JP)

( * ) Notice: Subject to any disclaimer, the term of this patent is extended or adjusted under 35 U.S.C. 154(b) by 1730 days.

(21) Appl. No.: 11/898,860

(22) Filed: Sep. 17, 2007

(65) Prior Publication Data

US 2008/0075428 A1  Mar. 27, 2008

(30) Foreign Application Priority Data

Sep. 22, 2006  (JP) .................................. 2006-257457

(51) Int. Cl.
*H04N 5/93* (2006.01)
*G03B 31/00* (2006.01)
*H04N 5/85* (2006.01)
*G03B 31/06* (2006.01)

(52) U.S. Cl.
CPC . *H04N 5/85* (2013.01); *G03B 31/06* (2013.01)
USPC ............. 386/353; 386/201; 386/248; 353/15

(58) Field of Classification Search
CPC ..... H04N 5/85; H04N 9/8042; G11B 27/105; G11B 27/10
USPC ... 386/239, 240, 248, 353, 201; 375/240.25; 353/15

See application file for complete search history.

(56) References Cited

U.S. PATENT DOCUMENTS 6,337,883 B1 *  1/2002  Tanaka ..................... 375/240.25

FOREIGN PATENT DOCUMENTS

| JP | A 2006-148679 | 6/2006 |
| JP | 2006-148679 | * 8/2006 |

* cited by examiner

Primary Examiner — Thai Tran
Assistant Examiner — Mishawn Dunn
(74) Attorney, Agent, or Firm — Oliff & Berridge, PLC

(57) ABSTRACT

An amplifier includes a first reception section which receives multimedia data via the Internet, a first separation section which separates sound data from the multimedia data, a synchronization data generation section which generates synchronization data based on the sound data, and a synchronization data transmission section which transmits the synchronization data to a set-top box via an infrared communication channel; and the set-top box includes a second reception section which receives the multimedia data via the Internet, a second separation section which separates image data from the multimedia data, a synchronization data reception section which receives the synchronization data via the infrared communication channel, and a matching section which determines reproduction target image data based on the synchronization data.

11 Claims, 6 Drawing Sheets

SYNCHRONIZED REPRODUCTION SYSTEM AND SYNCHRONIZED REPRODUCTION METHOD

Japanese Patent Application No. 2006-257457, filed on Sep. 22, 2006, is hereby incorporated by reference in its entirety.

BACKGROUND OF THE INVENTION

The present invention relates to a synchronized reproduction system and a synchronized reproduction method in which an image reproduction device and a sound reproduction device reproduce multimedia data including image data and sound data in synchronization.

A reproduction device transmits and receives a stream including image data and sound data via a network to reproduce a video image including sound. For example, such a synchronization reproduction technology is implemented using the Real-time Transport Protocol (RTP) specified by the RFC 1889.

However, when an image reproduction device and a sound reproduction device are separated, such as a set-top box connected to a projector which projects an image and an amplifier connected to a speaker which outputs sound, synchronization cannot be achieved using the RTP.

Therefore, technology has been proposed in which each reproduction device achieves synchronization using the RTP Control Protocol (RTCP) and the Network Time Protocol (NTP) while adjusting the reproduction time based on a reference clock signal.

However, since the RTCP requires about 5% of the transmission bandwidth for command transmission and reception, the band for transmitting the contents is reduced.

Technology has also been proposed in which a specific synchronization signal is added to a stream. However, this technology further reduces the transmission band and requires a process of adding the synchronization signal to the stream, whereby the device configuration becomes complicated.

For example, JP-A-2006-148679 discloses a data processing device which receives a data stream, reproduces the data stream, and reproduces an image and sound in synchronization using time information of image data and time information of sound data included in the data stream.

However, the method disclosed in JP-A-2006-148679 requires a process of reproducing the data stream and a storage area for storing the reproduced data stream.

SUMMARY

According to a first aspect of the invention, there is provided a synchronized reproduction system having at least one image reproduction device reproducing an image based on multimedia data including image data and sound data, and a sound reproduction device reproducing sound based on the multimedia data, the sound reproduction device including: a first reception section which receives the multimedia data from an information provision device via a first transmission channel; a first separation section which separates the sound data from the multimedia data; a synchronization data generation section which generates synchronization data based on the sound data; and a synchronization data transmission section which transmits the synchronization data to the image reproduction device via a second transmission channel differing from the first transmission channel; and the image reproduction device including: a second reception section which receives the multimedia data from the information provision device via the first transmission channel; a second separation section which separates the image data and the sound data from the multimedia data; a storage section which stores the image data and the sound data; a synchronization data reception section which receives the synchronization data via the second transmission channel; and a matching section which determines corresponding sound data from among the sound data stored in the storage section based on the synchronization data, and determines reproduction target image data corresponding to the determined sound data from among the image data stored in the storage section.

According to a second aspect of the invention, there is provided a synchronized reproduction system having at least one image reproduction device reproducing an image based on multimedia data including image data and sound data, and a sound reproduction device reproducing sound based on the multimedia data, the sound reproduction device including: a first reception section which receives the multimedia data from an information provision device via a first transmission channel; a first separation section which separates the sound data from the multimedia data; a synchronization data generation section which generates synchronization data based on the sound data; and a synchronization data transmission section which transmits the synchronization data to the image reproduction device via a second transmission channel differing from the first transmission channel; and the image reproduction device including: a second reception section which receives the multimedia data from the information provision device via the first transmission channel; a second separation section which separates the image data from the multimedia data; a storage section which stores the image data; a synchronization data reception section which receives the synchronization data via the second transmission channel; and a matching section which determines reproduction target image data based on the synchronization data.

According to a third aspect of the invention, there is provided a synchronized reproduction method using at least one image reproduction device reproducing an image based on multimedia data including image data and sound data, and a sound reproduction device reproducing sound based on the multimedia data, the method comprising steps of: causing the sound reproduction device to: receive the multimedia data from an information provision device via a first transmission channel; separate the sound data from the multimedia data; generate synchronization data based on the sound data; and transmit the synchronization data to the image reproduction device via a second transmission channel differing from the first transmission channel; and causing the image reproduction device to: receive the multimedia data from the information provision device via the first transmission channel; separate the image data and the sound data from the multimedia data; store the image data and the sound data; receive the synchronization data via the second transmission channel; determine corresponding sound data from among the stored sound data based on the synchronization data; and determine reproduction target image data corresponding to the determined sound data from among the stored image data.

According to a fourth aspect of the invention, there is provided a synchronized reproduction method using at least one image reproduction device reproducing an image based on multimedia data including image data and sound data, and a sound reproduction device reproducing sound based on the multimedia data, the method comprising steps of: causing the sound reproduction device to: receive the multimedia data from an information provision device via a first transmission channel; separate the sound data from the multimedia data;

generate synchronization data based on the sound data; and transmit the synchronization data to the image reproduction device via a second transmission channel differing from the first transmission channel; and causing the image reproduction device to: receive the multimedia data from the information provision device via the first transmission channel; separate the image data from the multimedia data; store the image data; receive the synchronization data via the second transmission channel; and determine reproduction target image data based on the synchronization data.

BRIEF DESCRIPTION OF THE SEVERAL VIEWS OF THE DRAWING

FIG. 3A is a schematic diagram showing multimedia data, FIG. 3B is a schematic diagram showing packet data, FIG. 3C is a schematic diagram showing separated sound data, and FIG. 3D is a schematic diagram showing synchronization data and primary-decoded sound data.

FIG. 5A is a schematic diagram showing multimedia data, FIG. 5B is a schematic diagram showing packet data, FIG. 5C is a schematic diagram showing separated image data and sound data, FIG. 5D is a schematic diagram showing primary-decoded image data and sound data, and FIG. 5E is a schematic diagram showing synchronization data.

DETAILED DESCRIPTION OF THE EMBODIMENT

Figure 1:
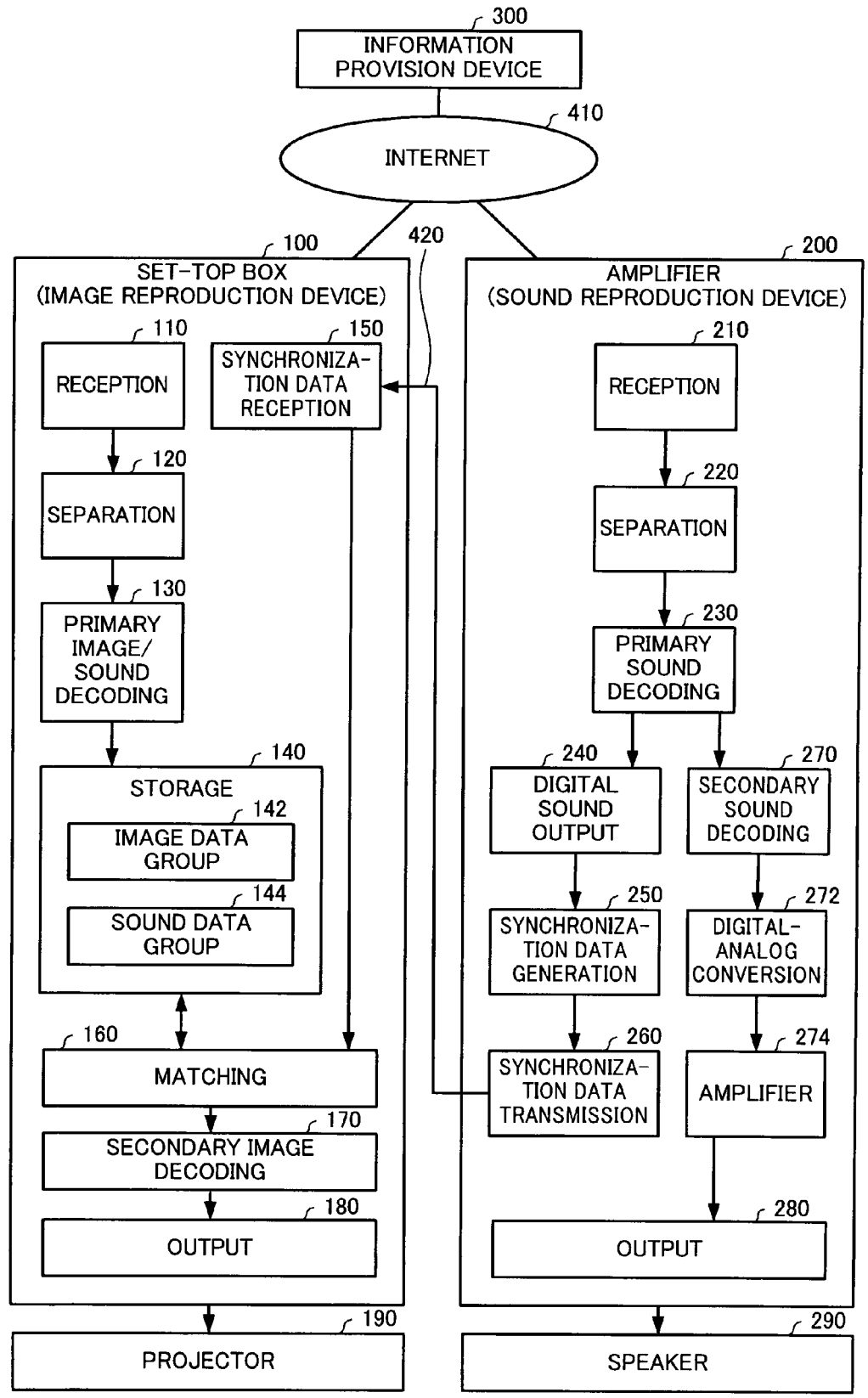
FIG. 1 is a functional block diagram of a synchronized reproduction system according to a first embodiment of the invention.

The invention may provide a synchronized reproduction system and a synchronized reproduction method which, when an image reproduction device and a sound reproduction device are separated, allow each reproduction device to more easily achieve synchronization without reducing a stream transmission band.

According to one embodiment of the invention, there is provided a synchronized reproduction system having at least one image reproduction device reproducing an image based on multimedia data including image data and sound data, and a sound reproduction device reproducing sound based on the multimedia data, the sound reproduction device including: a first reception section which receives the multimedia data from an information provision device via a first transmission channel; a first separation section which separates the sound data from the multimedia data; a synchronization data generation section which generates synchronization data based on the sound data; and a synchronization data transmission section which transmits the synchronization data to the image reproduction device via a second transmission channel differing from the first transmission channel; and the image reproduction device including: a second reception section which receives the multimedia data from the information provision device via the first transmission channel; a second separation section which separates the image data and the sound data from the multimedia data; a storage section which stores the image data and the sound data; a synchronization data reception section which receives the synchronization data via the second transmission channel; and a matching section which determines corresponding sound data from among the sound data stored in the storage section based on the synchronization data, and determines reproduction target image data corresponding to the determined sound data from among the image data stored in the storage section.

According to one embodiment of the invention, there is provided a synchronized reproduction method using at least one image reproduction device reproducing an image based on multimedia data including image data and sound data, and a sound reproduction device reproducing sound based on the multimedia data, the method comprising steps of: causing the sound reproduction device to: receive the multimedia data from an information provision device via a first transmission channel; separate the sound data from the multimedia data; generate synchronization data based on the sound data; and transmit the synchronization data to the image reproduction device via a second transmission channel differing from the first transmission channel; and causing the image reproduction device to: receive the multimedia data from the information provision device via the first transmission channel; separate the image data and the sound data from the multimedia data; store the image data and the sound data; receive the synchronization data via the second transmission channel; determine corresponding sound data from among the stored sound data based on the synchronization data; and determine reproduction target image data corresponding to the determined sound data from among the stored image data.

According to the above embodiment, the synchronized reproduction system can transmit the synchronization data using the second transmission channel differing from the first transmission channel through which a stream (multimedia data) is transmitted to synchronize the image and the sound without reducing the transmission band of the first transmission channel in a state in which the image reproduction device and the sound reproduction device are separated.

According to the above embodiment, since the synchronized reproduction system can achieve synchronization without adding synchronization data to the original stream or reproducing the stream, each reproduction device can more easily achieve synchronization.

According to the above embodiment, the synchronized reproduction system determines the corresponding sound data based on the synchronization data based on the sound data and determines the reproduction target image data corresponding to the determined sound data to easily achieve synchronization, even if the sound data and the image data do not have common synchronization information, whereby the synchronized reproduction system can achieve synchronization more flexibly.

According to one embodiment of the invention, there is provided a synchronized reproduction system having at least one image reproduction device reproducing an image based on multimedia data including image data and sound data, and a sound reproduction device reproducing sound based on the multimedia data, the sound reproduction device including: a first reception section which receives the multimedia data from an information provision device via a first transmission channel; a first separation section which separates the sound data from the multimedia data; a synchronization data generation section which generates synchronization data based on the sound data; and a synchronization data transmission section which transmits the synchronization data to the image reproduction device via a second transmission channel differing from the first transmission channel; and the image reproduction device including: a second reception section which receives the multimedia data from the information provision device via the first transmission channel; a second separation section which separates the image data from the multimedia data; a storage section which stores the image data; a synchronization data reception section which receives the synchronization data via the second transmission channel; and a matching section which determines reproduction target image data based on the synchronization data.

According to one embodiment of the invention, there is provided a synchronized reproduction method using at least one image reproduction device reproducing an image based on multimedia data including image data and sound data, and a sound reproduction device reproducing sound based on the multimedia data, the method comprising steps of: causing the sound reproduction device to: receive the multimedia data from an information provision device via a first transmission channel; separate the sound data from the multimedia data; generate synchronization data based on the sound data; and transmit the synchronization data to the image reproduction device via a second transmission channel differing from the first transmission channel; and causing the image reproduction device to: receive the multimedia data from the information provision device via the first transmission channel; separate the image data from the multimedia data; store the image data; receive the synchronization data via the second transmission channel; and determine reproduction target image data based on the synchronization data.

According to the above embodiment, the synchronized reproduction system can transmit the synchronization data using the second transmission channel differing from the first transmission channel through which a stream (multimedia data) is transmitted to synchronize the image and the sound without reducing the transmission band of the first transmission channel in a state in which the image reproduction device and the sound reproduction device are separated.

According to the above embodiment, since the synchronized reproduction system can achieve synchronization without adding synchronization data to the original stream or reproducing the stream, each reproduction device can more easily achieve synchronization.

According to the above embodiment, since the synchronized reproduction system can achieve synchronization without storing the sound data in the image reproduction device, the storage capacity necessary for synchronization can be further reduced.

In this synchronized reproduction system, the synchronization data may include pattern data indicating a reproduction scheduled time of the sound data; and the matching section may determine the reproduction target image data based on the pattern data.

This enables the synchronized reproduction system to achieve synchronization based on the time.

In this synchronized reproduction system, the synchronization data may include pattern data indicating part of the sound data; and the matching section may determine corresponding sound data from among the sound data stored in the storage section based on the pattern data.

This enables the synchronized reproduction system to achieve synchronization using part of the sound data. Therefore, since the synchronized reproduction system can achieve synchronization even if the time information is not included in the sound data, the synchronized reproduction system can deal with various types of sound data.

In this synchronized reproduction system, the multimedia data may be divided into a plurality of packets and transmitted by the information provision device; the synchronization data may include pattern data indicating packet identification information; and the matching section may determine the reproduction target image data based on the packet identification information.

Since this enables the synchronized reproduction system to achieve synchronization using the packet identification data, the transmission band occupied of the second transmission channel can be reduced as compared with the case of achieving synchronization using part of the sound data.

In this synchronized reproduction system, the synchronization data generation section may determine a type of the sound data, and generate the synchronization data including the pattern data and type data of the sound data based on the determined type.

This enables the synchronized reproduction system to achieve synchronization using the synchronization data suitable for the type of the sound data.

In this synchronized reproduction system, the matching section may determine a matching method based on the type data.

This enables the synchronized reproduction system to achieve synchronization using the synchronization data suitable for the type of the sound data. Specifically, the matching section can match the data using the reproduction scheduled time as the search key when the reproduction scheduled time is included in the sound data, can match the data using the packet identification information as the search key when the packet identification information is included in the sound data, and can match the data using part of the data string of the sound data as the search key when the reproduction scheduled time and the packet identification information are not included in the sound data.

The invention is described below with reference to the drawings taking the case of applying the invention to a synchronized reproduction system as an example. Note that the embodiments described below do not in any way limit the scope of the invention laid out in the claims herein. In addition, not all of the elements of the embodiments described below should be taken as essential requirements of the invention.

First Embodiment

FIG. 1 is a functional block diagram of a synchronized reproduction system according to a first embodiment.

The synchronized reproduction system according to this embodiment is configured to include a set-top box 100 which is one type of image reproduction device, and an amplifier 200 which is one type of sound reproduction device.

A user requests an information provision device 300 to distribute desired multimedia data (e.g. movie or drama) using the set-top box 100.

The information provision device 300 transmits multimedia data including image data and sound data to the set-top box 100 and the amplifier 200 by multicasting via an Internet 410 in response to the request. The multimedia data is a Moving Picture Experts Group 2 transport stream (MPEG2-TS) which is one type of stream, for example. The multimedia data is divided into a plurality of 188-byte packets and transmitted.

An example is described below where the set-top box 100 and the amplifier 200 reproduce an image (picture) and sound in synchronization by a video-on-demand method using the MPEG2-TS.

The amplifier 200 is configured to include a reception section 210 which receives a packet from the information provision device 300 via the Internet 410 which is a first transmission channel, a separation section 220 which separates sound data from the packet, a primary sound decoding section 230 which decodes the sound data into a sound data format, a digital sound output section 240 which outputs the decoded sound data, a synchronization data generation section 250 which generates synchronization data based on the sound data output from the digital sound output section 240, and a synchronization data transmission section 260 which transmits the synchronization data to the set-top box 100 via an infrared communication channel 420 which is a second transmission channel.

The amplifier 200 is configured to include a secondary sound decoding section 270 which decodes the sound data (e.g. AD3 data) decoded by the primary sound decoding section 230 into digital data (bit string), a digital-analog conversion section 272 which converts the digital data into an analog signal, an amplifier section 274 which amplifies the analog signal, and an output section 280 which outputs the amplified signal to a speaker 290.

The set-top box 100 includes a reception section 110 which receives a packet from the information provision device 300 via the Internet 410, a separation section 120 which separates image data and sound data from the packet, a primary image/sound decoding section 130 which decodes the image data and the sound data into the format of each data, and a storage section 140 which stores the decoded data as an image data group 142 and a sound data group 144.

The set-top box 100 also includes a synchronization data reception section 150 which receives synchronization data from the amplifier 200 via the infrared communication channel 420, a matching section 160 which determines corresponding sound data from among the sound data group 144 based on the synchronization data, and determines reproduction target image data corresponding to the determined sound data from among the image data group 142, a secondary image decoding section 170 which decodes the determined image data into digital data (bit string), and an output section 180 which outputs the digital data to a projector 190.

As hardware for implementing each section, the following hardware may be used, for example. A digital sound output interface which outputs an optical digital sound signal or the like may be used as the digital sound output section 240. A CPU or the like may be used as the synchronization data generation section 250 and the matching section 160. An infrared communication interface or the like may be used as the synchronization data reception section 150. The hardware provided in the set-top box 100 and the amplifier 200 may be directly used as each section other than the above sections. The functions of the reception section 110 and the reception section 210 may be implemented using a common modem outside each reproduction device, for example. The digital sound output section 240 may be omitted, and the primary-decoded sound data may be output from the primary sound decoding section 230 to the synchronization data generation section 250.

The flow of a process using each section is described below. The flow of a process of the amplifier 200 is as follows.

Figure 2:
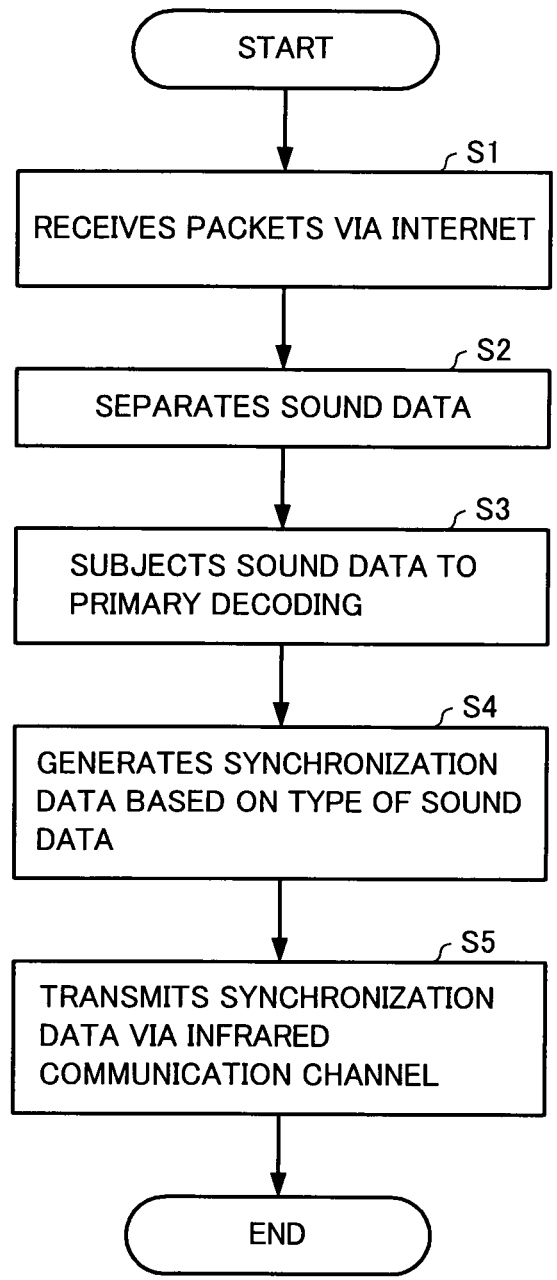
FIG. 2 is a flowchart showing flow of process of an amplifier according to the first embodiment.
Figure 3:
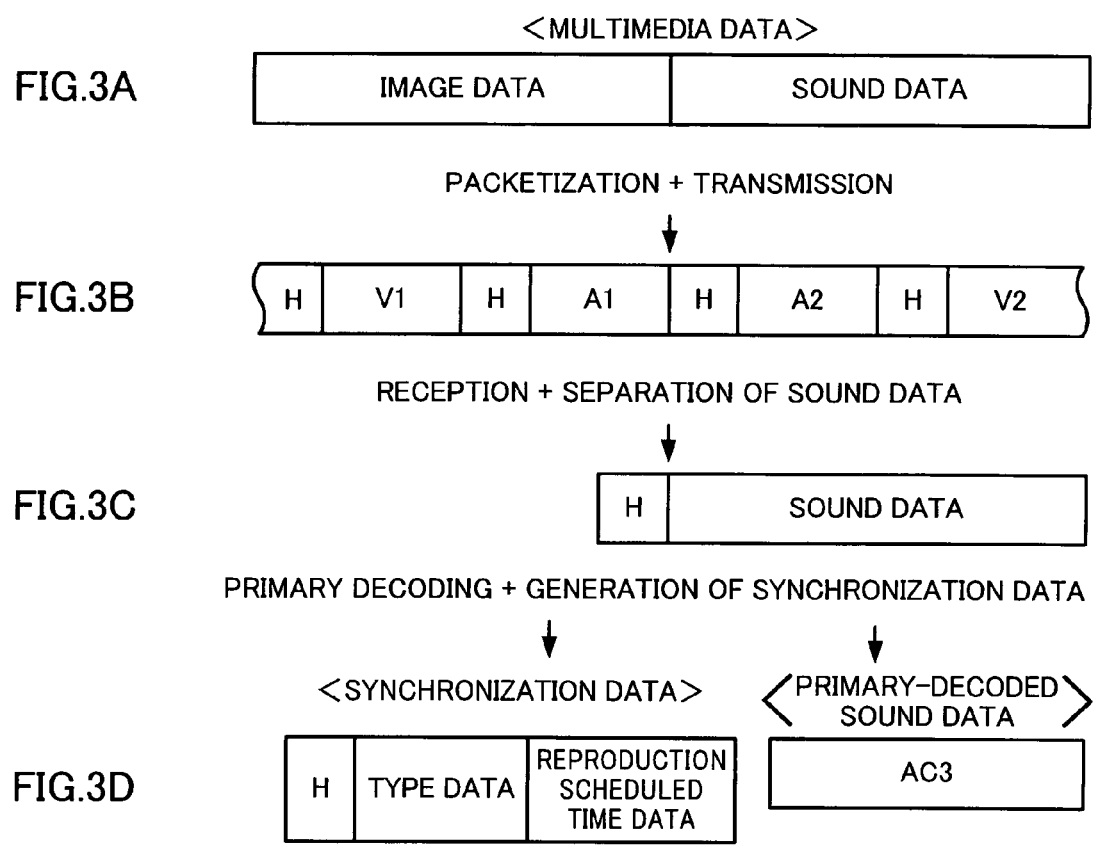
FIGS. 3A to 3D are schematic diagrams showing a change in data in the amplifier according to the first embodiment.

FIG. 2 is a flowchart showing the flow of the process of the amplifier 200 according to the first embodiment. FIGS. 3A to 3D are schematic diagrams showing a change in data in the amplifier according to the first embodiment. FIG. 3A is a schematic diagram showing multimedia data, FIG. 3B is a schematic diagram showing packet data, FIG. 3C is a schematic diagram showing separated sound data, and FIG. 3D is a schematic diagram showing synchronization data and primary-decoded sound data.

The information provision device 300 divides the multimedia data shown in FIG. 3A into a plurality of packets, and distributes the packets to the set-top box 100 and the amplifier 200 as an MPEG2-TS (stream) shown in FIG. 3B.

The reception section 210 sequentially receives the packets from the information provision device 300 via the Internet 410 in the order from the head packet (step S1). Each packet includes a header portion (H) and a data portion (e.g. image data (e.g. V1) and sound data (e.g. A1)). The header portion includes a packet identifier (PID) for identifying the packet type, a counter indicating the packet number, and the like. The data portion is basically image data or sound data, but may include control data or the like.

The separation section 220 assembles the packets, and separates the original sound data (step S2). This allows the sound data shown in FIG. 3C to be generated. In the MPEG2-TS standard, the above separation operation is called DEMUX (de-multiplex), and the separated sound data is called a sound elementary stream.

The primary sound decoding section 230 subjects the sound data to primary decoding (step S3). This allows the primary-decoded sound data shown in FIG. 3D to be generated. In this embodiment, an Audio Code number 3 (AC3) format is used as the format of the sound data.

The digital sound output section 240 outputs the decoded sound data in a digital format, and the synchronization data generation section 250 generates the synchronization data shown in FIG. 3D based on the sound data (step S4). Specifically, the synchronization data generation section 250 determines the type of the sound data from the AD3 header, determines the reproduction scheduled time from the AC3 timecod1 and timecod2, and generates the synchronization data including a header suitable for communication by the synchronization data transmission section 260, type data indicating the type of the sound data, and reproduction scheduled time data indicating the reproduction scheduled time of the sound data.

The synchronization data transmission section 260 modulates the synchronization data into a format suitable for the infrared communication channel 420, and transmits the synchronization data to the set-top box 100 via the infrared communication channel 420 (step S5).

The secondary sound decoding section 270 converts the primary-decoded sound data into a digital value, the digital-analog conversion section 272 converts the digital value into an analog signal, the amplifier section 274 amplifies the analog signal, the output section 280 outputs the analog signal to the speaker 290, and the speaker 290 outputs sound based on the analog signal. The flow of this process is the same as a general MPEG2 sound reproduction process.

A process of the set-top box 100 is as follows.

Figure 4:
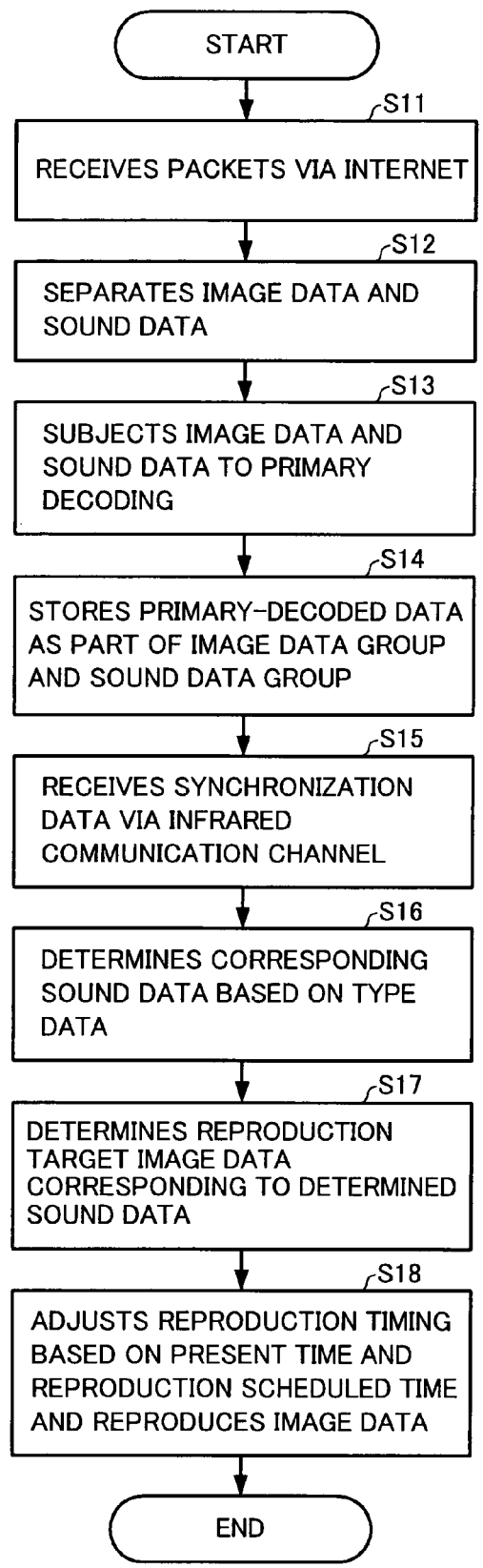
FIG. 4 is a flowchart showing flow of process of a set-top box according to the first embodiment.
Figure 5:
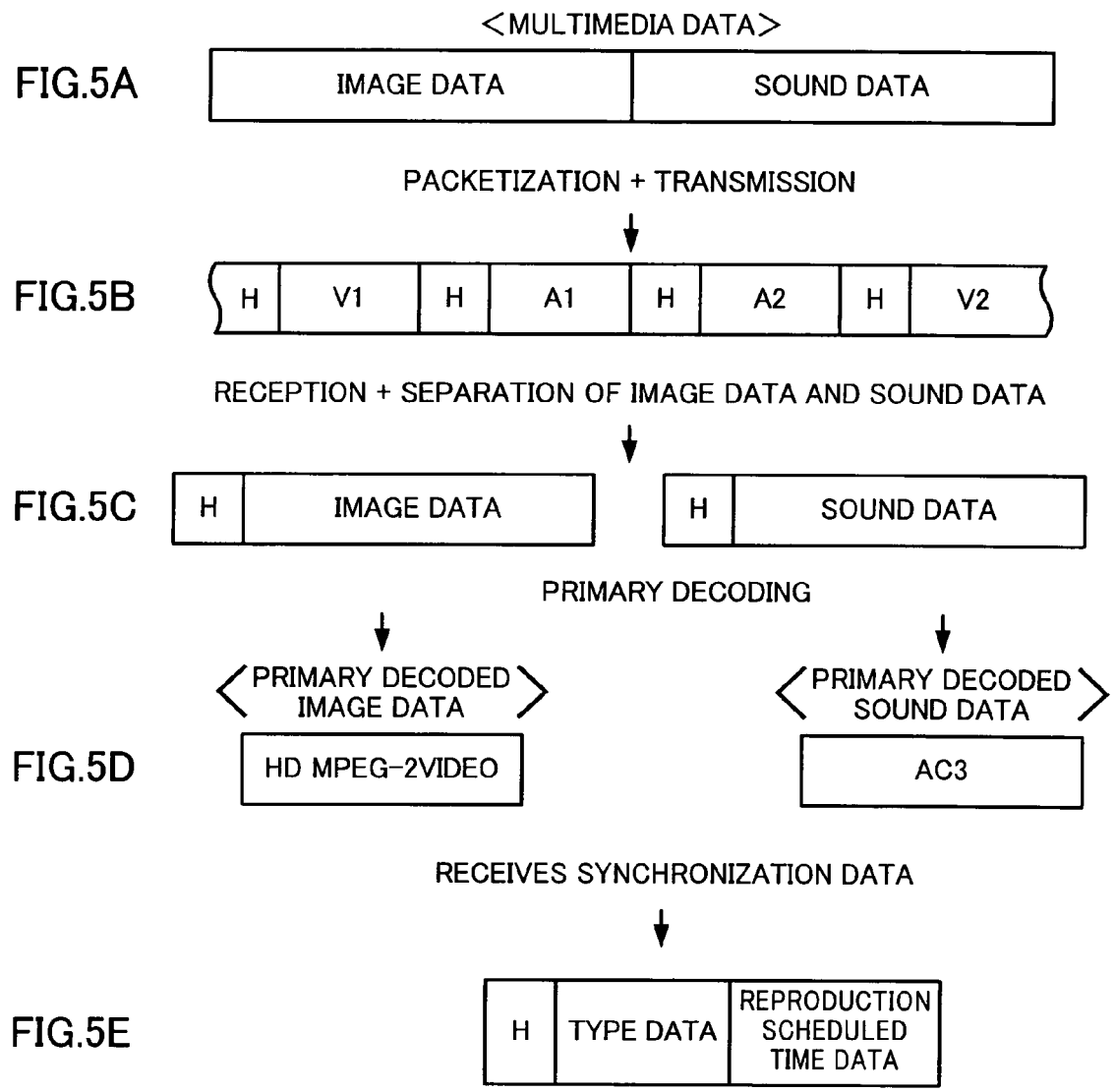
FIGS. 5A to 5E are schematic diagrams showing a change in data in the set-top box according to the first embodiment.

FIG. 4 is a flowchart showing the flow of the process of the set-top box 100 according to the first embodiment. FIGS. 5A to 5E are schematic diagrams showing a change in data in the set-top box according to the first embodiment. FIG. 5A is a schematic diagram showing multimedia data, FIG. 5B is a schematic diagram showing packet data, FIG. 5C is a schematic diagram showing separated image data and sound data, FIG. 5D is a schematic diagram showing primary-decoded image data and sound data, and FIG. 5E is a schematic diagram showing synchronization data.

The information provision device 300 divides the multimedia data shown in FIG. 5A into a plurality of packets, and distributes the packets to the set-top box 100 and the amplifier 200 as an MPEG2-TS (stream) shown in FIG. 5B.

The reception section 110 sequentially receives the packets from the information provision device 300 via the Internet 410 (step S11).

The separation section 120 assembles the packets, and separates the original image data and sound data (step S12). This allows the image data and the sound data shown in FIG. 5C to be generated.

The primary image decoding section 130 subjects the image data and the sound data to primary decoding (step S13). This allows the primary-decoded image data and the primary-decoded sound data shown in FIG. 5D to be generated. In this embodiment, a high-definition (HD) MPEG-2 Video format is used as the format of the image data, and an AD3 format is used as the format of the sound data.

The primary sound decoding section 130 stores the primary-decoded data in the storage section 140 as part of the image data group 142 and the sound data group 144 (step S14).

The synchronization data reception section 150 receives the synchronization data shown in FIG. 5E from the amplifier 200 via the infrared communication channel 420 (step S15). When the synchronization data has been modulated (e.g. when the digital value has been changed into infrared light), the synchronization data reception section 150 receives the synchronization data while demodulating the synchronization data (e.g. reconverting the infrared light into the digital value).

The matching section 160 determines that the target sound data is AD3 data based on the type data included in the synchronization data, refers to the reproduction scheduled time data included in the synchronization data, and searches the sound data group 144 to determine the sound data corresponding to the reproduction scheduled time (step S16).

The matching section 160 searches the image data group 142 to determine the reproduction target image data corresponding to the determined sound data (step S17). Specifically, when the reproduction scheduled time is included in the image data, the matching section 160 determines the image data of which the reproduction scheduled time coincides with the reproduction scheduled time of the sound data to be the reproduction target image data, for example. When the consecutive packet numbers (packet identification information) are included in the image data, the matching section 160 determines the image data of which the consecutive numbers are most close to the consecutive numbers of the sound data to be the reproduction target image data.

The matching section 160 adjusts the reproduction timing (e.g. indicates the reproduction target image data to the secondary image decoding section 170 or interpolates or thins out the image data) based on the present time (e.g. the reproduction time of the secondary image decoding section 170 or the time of a system timer of the set-top box 100) and the reproduction scheduled time of the reproduction target image data, the secondary image decoding section 170 decodes the image data in the HD MPEG-2 Video format into a digital value, the output section 180 outputs the digital value to the projector 190, and the projector 190 reproduces the image data by projecting an image based on the digital value (step S18). The image/sound synchronization method is a generally employed method. The matching section 160 adjusts the image reproduction timing so that the delay of the sound with respect to the image is within about 0 to 30 milliseconds.

According to this embodiment, the synchronized reproduction system can transmit the synchronization data using the infrared communication channel 420 which is a transmission channel differing from the Internet 410 through which the stream is transmitted to synchronize the image and the sound without reducing the transmission band of the Internet 410 in a state in which the image reproduction device and the sound reproduction device are separated.

Since the sound data is not included in the synchronization data, the synchronized reproduction system can use a relatively low-speed transmission channel such as an infrared communication channel possessed by the set-top box 100 and the amplifier 200, the synchronized reproduction system can achieve synchronization without using additional hardware while reducing power consumption.

According to this embodiment, since the synchronized reproduction system can achieve synchronization without adding synchronization data to the original stream or reproducing the stream, each reproduction device can more easily achieve synchronization.

According to this embodiment, the synchronized reproduction system determines the corresponding sound data based on the synchronization data based on the sound data and determines the reproduction target image data corresponding to the determined sound data to easily achieve synchronization, even if the sound data and the image data do not have common synchronization information (e.g. reproduction scheduled time information), whereby the synchronized reproduction system can achieve synchronization more flexibly.

Specifically, when the sound data includes the reproduction scheduled time information and the packet identification information and the image data does not include the reproduction scheduled time information and includes only the packet identification information, for example, the matching section 160 cannot directly determine the reproduction target image data from the reproduction scheduled time information included in the synchronization data. However, the matching section 160 can determine the sound data which coincides with the reproduction scheduled time information, and determine the reproduction target image data from the packet identification information of the sound data.

Second Embodiment

In the first embodiment, the image reproduction device also stores the sound data, and achieves synchronization using the synchronization data and the sound data. Note that the image reproduction device may not store the sound data, and achieve synchronization using the synchronization data and the image data. The procedure of this synchronization method is given below.

Figure 6:
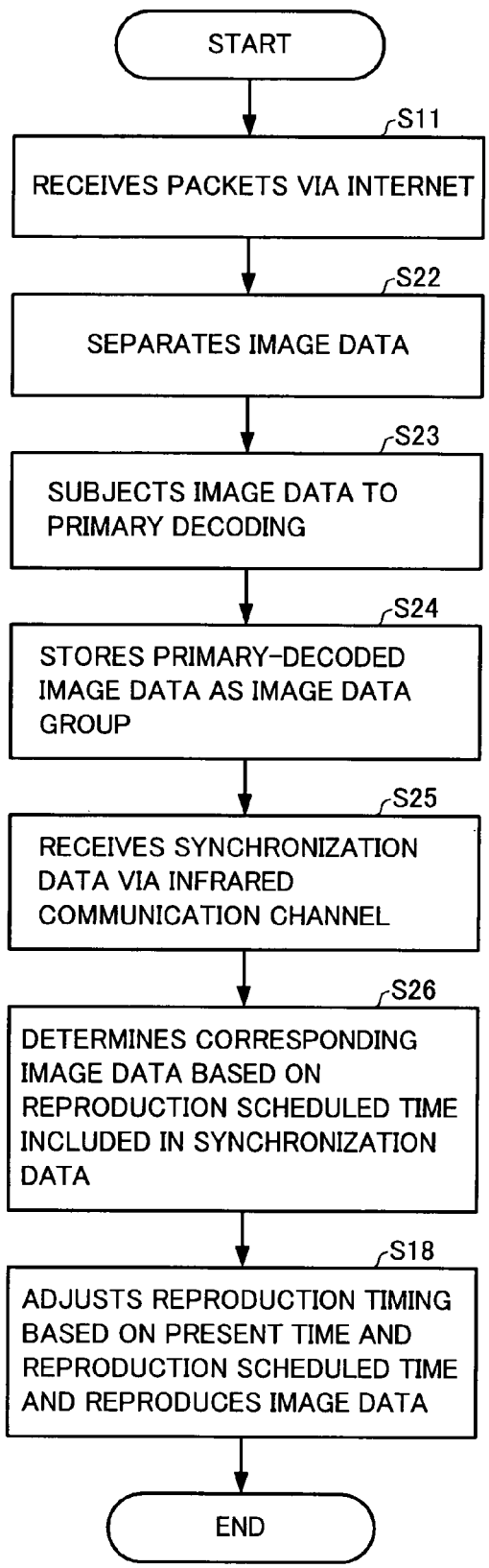
FIG. 6 is a flowchart showing flow of process of an image reproduction device according to a second embodiment.

FIG. 6 is a flowchart showing the flow of a process of the image reproduction device according to a second embodiment.

In this embodiment, common reproduction scheduled time information is included in the image data and the sound data. As examples of the reproduction scheduled time information, a presentation time stamp (PTS) and the like can be given.

The reception section 110 sequentially receives the packets from the information provision device 300 via the Internet 410 (step S11).

The separation section 120 assembles the packets, and separates the original image data (step S22).

The primary image decoding section 130 subjects the image data to primary decoding (step S23). In this embodiment, it suffices that the primary image decoding section 130 have only the image data decoding function.

The primary image/sound decoding section 130 stores the primary-decoded image data in the storage section 140 as part of the image data group 142 (step S24). In this embodiment, the sound data group 144 is not stored in the storage section 140.

The synchronization data reception section 150 receives the synchronization data from the amplifier 200 via the infrared communication channel 420 (step S25). In this embodiment, the synchronization data need not necessarily include the type data. It suffices that the synchronization data include the reproduction scheduled time data.

The matching section 160 refers to the reproduction scheduled time data included in the synchronization data, and searches the image data group 142 to determine the image data which coincides with the reproduction scheduled time (step S26).

The matching section 160 and the like adjust the reproduction timing based on the present time and the reproduction scheduled time of the reproduction target image data, and reproduce the image data (step S18).

According to the second embodiment, the synchronized reproduction system can achieve the same effects as those of the first embodiment.

According to this embodiment, since the synchronized reproduction system can achieve synchronization without storing the sound data in the image reproduction device, the storage capacity necessary for synchronization can be further reduced.

Other Embodiments

The invention is not limited to the above embodiments. Various modifications and variations may be made.

In the above embodiments, pattern data indicating the reproduction scheduled time is employed as pattern data of the synchronization data. Note that pattern data indicating the packet identification information of the sound data may be used when the reproduction scheduled time is not included in the sound data. When the reproduction scheduled time and the packet identification information are not included in the sound data, pattern data indicating part of the sound data (e.g. data of several bytes from the head of the sound data) may be used.

According to this configuration, since the synchronized reproduction system can achieve synchronization, even if the reproduction scheduled time information is not included in the sound data, the synchronized reproduction system can deal with sound data of various patterns.

In the above embodiments, the AD3 format is used as the format of the sound data. For example, the format of the sound data may be a linear pulse code modulation (LPCM) format, a Digital Theater Systems (DTS) format, an MPEG1 Layer 2 format, or the like.

The image reproduction device is not limited to the combination of the set-top box 100 and the projector 190. The image reproduction device may include various devices capable of outputting an image, such as a TV, a monitor, and a personal computer (PC).

The invention is also effective when one sound reproduction device and two or more image reproduction devices are synchronized. Specifically, the invention is also effective for a synchronized reproduction system in which sound is output from a speaker while displaying a large image on two or more monitors arranged side by side in an exhibition site, for example.

The sound reproduction device is not limited to the combination of the amplifier 200 and the speaker. The sound reproduction device may include various devices capable of outputting sound, such as a set-top box and a TV.

The first transmission channel is not limited to the Internet 410, but may be a home network or the like.

The transmission method of the information provision device 300 is not limited to a multicast method. For example, a unicast method or the like may be employed.

In the above embodiments, the multimedia data is divided into a plurality of packets and distributed to each reproduction device. For example, when the first transmission channel is a high-speed, large-capacity transmission channel, the multimedia data may be distributed to each reproduction device as a single stream in frame units.

The second transmission channel is not limited to the infrared communication channel 420, but may be a wireless transmission channel such as a laser communication channel or a cable transmission channel using an IEEE1394 cable or a USB cable, for example.

In the above embodiments, each reproduction device performs primary decoding and secondary decoding. However, the decoding method is arbitrary. It is not indispensable to perform decoding twice.

In the above embodiments, the MPEG2-TS is used as the stream. Note that another MPEG stream may be used.

Although only some embodiments of this invention have been described in detail above, those skilled in the art will readily appreciate that many modifications are possible in the embodiments without materially departing from the novel teachings and advantages of this invention. Accordingly, all such modifications are intended to be included within the scope of the invention.

What is claimed is:

1. A synchronized reproduction system having at least one image reproduction device reproducing an image based on multimedia data including image data and sound data, and a sound reproduction device reproducing sound based on the multimedia data, the sound reproduction device including:
a first reception section which receives the multimedia data from an information provision device via a first transmission channel;
a first separation section which separates the sound data from the multimedia data;
a synchronization data generation section which generates synchronization data based on the sound data; and
a synchronization data transmission section which transmits the synchronization data to the image reproduction device via a second transmission channel differing from the first transmission channel; and the image reproduction device including:
a second reception section which receives the multimedia data from the information provision device via the first transmission channel;
a second separation section which separates the image data and the sound data from the multimedia data;
a storage section which stores the image data and the sound data;
a synchronization data reception section which receives the synchronization data via the second transmission channel; and
a matching section which determines corresponding sound data from among the sound data stored in the storage section based on the synchronization data, and determines reproduction target image data corresponding to the determined sound data from among the image data stored in the storage section, wherein
the synchronization data includes pattern data indicating part of the sound data, and
the matching section determines corresponding sound data from among the sound data stored in the storage section based on the pattern data.

2. A synchronized reproduction system having at least one image reproduction device reproducing an image based on multimedia data including image data and sound data, and a sound reproduction device reproducing sound based on the multimedia data, the sound reproduction device including:
a first reception section which receives the multimedia data from an information provision device via a first transmission channel;
a first separation section which separates the sound data from the multimedia data;
a synchronization data generation section which generates synchronization data based on the sound data; and
a synchronization data transmission section which transmits the synchronization data to the image reproduction device via a second transmission channel differing from the first transmission channel; and the image reproduction device including:
a second reception section which receives the multimedia data from the information provision device via the first transmission channel;
a second separation section which separates the image data from the multimedia data;
a storage section which stores the image data;
a synchronization data reception section which receives the synchronization data via the second transmission channel; and
a matching section which determines reproduction target image data based on the synchronization data, wherein
the multimedia data is divided into a plurality of packets and transmitted by the information provision device;
the synchronization data includes pattern data indicating packet identification information; and
the matching section determines the reproduction target image data based on the packet identification information.

3. The synchronized reproduction system according to claim 1,
wherein the synchronization data includes pattern data indicating a reproduction scheduled time of the sound data; and
wherein the matching section determines the reproduction target image data based on the pattern data.

4. The synchronized reproduction system according to claim 2,
wherein the synchronization data includes pattern data indicating a reproduction scheduled time of the sound data; and
wherein the matching section determines the reproduction target image data based on the pattern data.

5. The synchronized reproduction system according to claim 1,
wherein the multimedia data is divided into a plurality of packets and transmitted by the information provision device;
wherein the synchronization data includes pattern data indicating packet identification information; and
wherein the matching section determines the reproduction target image data based on the packet identification information.

6. The synchronized reproduction system according to claim 3,
wherein the synchronization data generation section determines a type of the sound data, and generates the synchronization data including the pattern data and type data of the sound data based on the determined type.

7. The synchronized reproduction system according to claim 4,
wherein the synchronization data generation section determines a type of the sound data, and generates the synchronization data including the pattern data and type data of the sound data based on the determined type.

8. The synchronized reproduction system according to claim 6,
wherein the matching section determines a matching method based on the type data.

9. The synchronized reproduction system according to claim 7,
wherein the matching section determines a matching method based on the type data.

10. A synchronized reproduction method using at least one image reproduction device reproducing an image based on multimedia data including image data and sound data, the at least one image reproduction device having a storage section and a matching section, and a sound reproduction device reproducing sound based on the multimedia data, the method comprising steps of:
causing the sound reproduction device to:
receive the multimedia data from an information provision device via a first transmission channel;
separate the sound data from the multimedia data;
generate synchronization data based on the sound data; and
transmit the synchronization data to the image reproduction device via a second transmission channel differing from the first transmission channel; and
causing the image reproduction device to:
receive the multimedia data from the information provision device via the first transmission channel;
separate the image data and the sound data from the multimedia data;
store the image data and the sound data;
receive the synchronization data via the second transmission channel;
determine corresponding sound data from among the stored sound data based on the synchronization data; and
determine reproduction target image data corresponding to the determined sound data from among the stored image data, wherein
the synchronization data includes pattern data indicating part of the sound data, and
the matching section determines corresponding sound data from among the sound data stored in the storage section based on the pattern data.

11. A synchronized reproduction method using at least one image reproduction device reproducing an image based on multimedia data including image data and sound data, and a sound reproduction device reproducing sound based on the multimedia data, the method comprising steps of:
causing the sound reproduction device to:
receive the multimedia data from an information provision device via a first transmission channel;
separate the sound data from the multimedia data;
generate synchronization data based on the sound data; and
transmit the synchronization data to the image reproduction device via a second transmission channel differing from the first transmission channel; and
causing the image reproduction device to:
receive the multimedia data from the information provision device via the first transmission channel;
separate the image data from the multimedia data;
store the image data;
receive the synchronization data via the second transmission channel; and
determine reproduction target image data based on the synchronization data, wherein
the multimedia data is divided into a plurality of packets and transmitted by the information provision device;

the synchronization data includes pattern data indicating packet identification information; and the reproduction target image data is determined based on the packet identification information.

\* \* \* \* \*